US012061878B2

(12) United States Patent
Ertl

(10) Patent No.: US 12,061,878 B2
(45) Date of Patent: Aug. 13, 2024

(54) METHOD AND SYSTEM FOR CALCULATING MINWISE HASH SIGNATURES FROM WEIGHTED SETS

(71) Applicant: Dynatrace LLC, Waltham, MA (US)

(72) Inventor: Otmar Ertl, Linz (AT)

(73) Assignee: Dynatrace LLC, Waltham, MA (US)

( * ) Notice: Subject to any disclaimer, the term of this patent is extended or adjusted under 35 U.S.C. 154(b) by 0 days.

(21) Appl. No.: 18/141,506

(22) Filed: May 1, 2023

(65) Prior Publication Data

US 2023/0333817 A1     Oct. 19, 2023

Related U.S. Application Data

(63) Continuation of application No. 16/786,992, filed on Feb. 10, 2020, now Pat. No. 11,645,043.

(60) Provisional application No. 62/803,750, filed on Feb. 11, 2019.

(51) Int. Cl.
| | |
|---|---|
| *G06F 16/00* | (2019.01) |
| *G06F 7/58* | (2006.01) |
| *G06F 16/14* | (2019.01) |
| *G06F 18/2113* | (2023.01) |
| *G06F 18/22* | (2023.01) |

(52) U.S. Cl.
CPC ............ *G06F 7/582* (2013.01); *G06F 16/152* (2019.01); *G06F 18/2113* (2023.01); *G06F 18/22* (2023.01)

(58) Field of Classification Search
None
See application file for complete search history.

(56) References Cited

U.S. PATENT DOCUMENTS

| 7,024,592 B1 | 4/2006 | Voas et al. |
|---|---|---|
| 2006/0095521 A1 | 5/2006 | Patinkin |

(Continued)

FOREIGN PATENT DOCUMENTS

| CA | 2899238 A1 * | 7/2014 | ............ B64C 21/04 |
|---|---|---|---|
| GB | 2540562 A | 1/2017 | |

OTHER PUBLICATIONS

U.S. Appl. No. 16/786,992, filed Feb. 10, 2020.
(Continued)

*Primary Examiner* — Tuankhanh D Phan
(74) *Attorney, Agent, or Firm* — Harness, Dickey & Pierce, P.L.C.

(57) ABSTRACT

A system and method for the creation of locality sensitive hash signatures using weighted feature sets is disclosed. The disclosed methodology takes advantage of discretization mechanisms commonly used in computer systems to model the influence of the feature weights on the calculated hash signature. Pseudo random numbers required for the signature calculation are created in ascending order, which enables the signature generation mechanism to identify and avoid the unnecessary creation of pseudo random numbers to improve the performance of the signature calculation process. Further, hierarchic, tree-search like algorithms are used during the processing of signature weights to further decrease the number of required random numbers. The features of the Poisson Process model, like its ability to provide random numbers in ascending order and the split— and mergeability of Poisson Processes are used to further improve the performance of the signature calculation process.

21 Claims, 10 Drawing Sheets

Related U.S. Application Data

(56) References Cited

U.S. PATENT DOCUMENTS

| | | |
|---|---|---|
| 2017/0032413 A1 | 2/2017 | McCartney |
| 2017/0201503 A1 | 7/2017 | Jayasena et al. |
| 2018/0203916 A1 | 7/2018 | Rafsky et al. |
| 2018/0357422 A1 | 12/2018 | Telang et al. |

OTHER PUBLICATIONS

U.S. Appl. No. 17/887,079, filed Aug. 12, 2022, Otmar Ertl et al.

Animesh Nandi, et al., Anomaly Detection Using Program Control Flow Graph Mining From Execution Logs, KDD '16, Aug. 13-17, 2016, San Francisco, CA, pp. 215-224, ACM Press, New York, NY, USA.

Tristan Cacqueray, Anomaly Detection in CI Logs, RDO, Nov. 14, 2017, pp. 1-11.

Jack W. Stokes, et al., MART: Targeted Attack Detection on a Compromised Network, MILCOM 2016-2016 IEEE Military Communications Conference, Nov. 1, 2016, pp. 988-997.

Otmar Ertl, SuperMinHash—A New Minwise Hashing Algorithm for Jaccard Similarity Estimation, arXiv:1706.05698v1, Jun. 18, 2017, Cornell University Library, Ithaca, NY, USA.

O. Ertl—BagMinHash—Minwise hashing algorithm for weighted sets. In proceedings of the ACM SIGKDD 24th International Conference on Knowledge Discovery and Data Mining (KDD), pp. 1368-1377, 2018.

Ormat Ertl, Aug. 2018. KDD 2008. BagMinHash-Minwise Hashing Algorithm for Weighted Sets. Research Track Paper.

\* cited by examiner

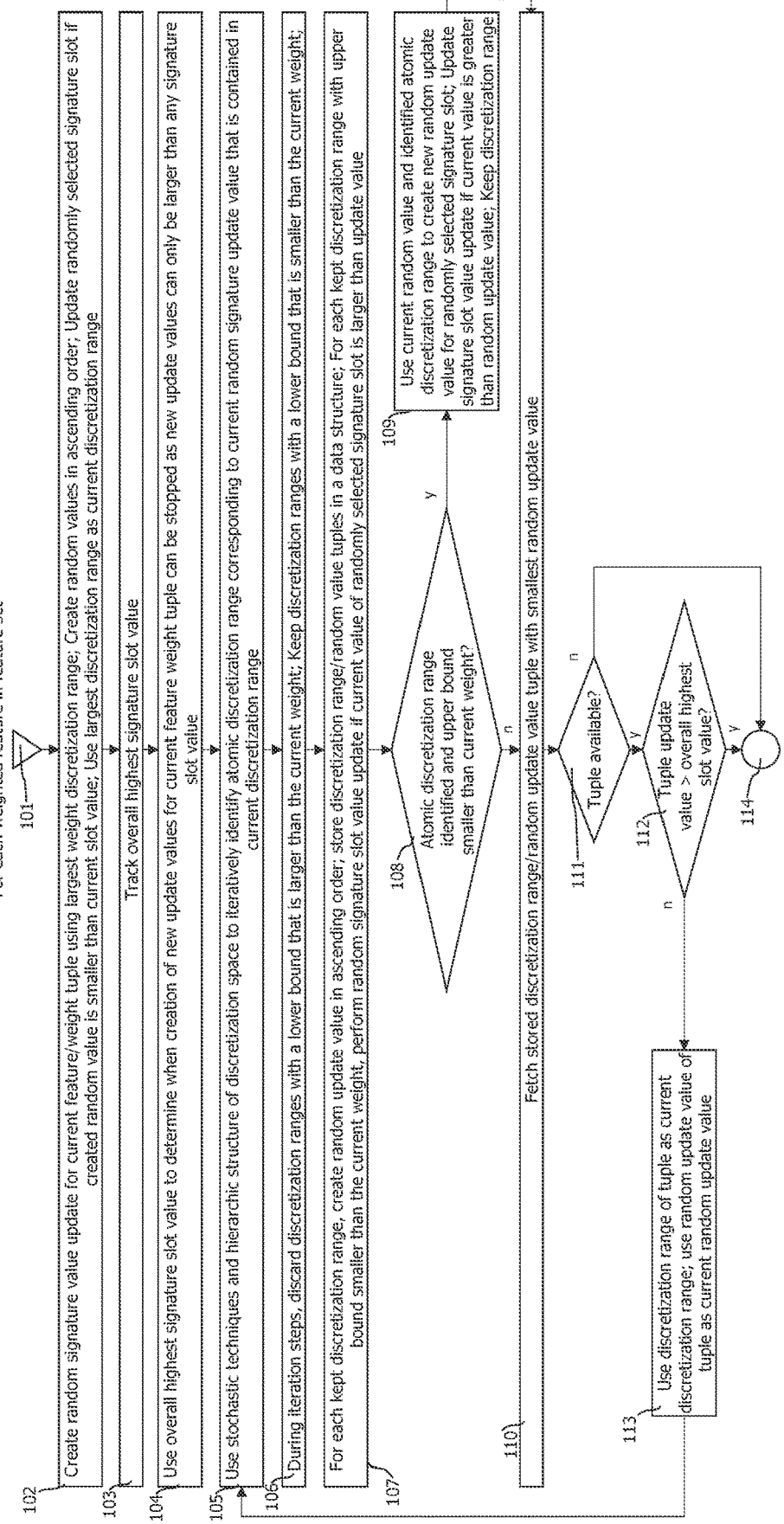

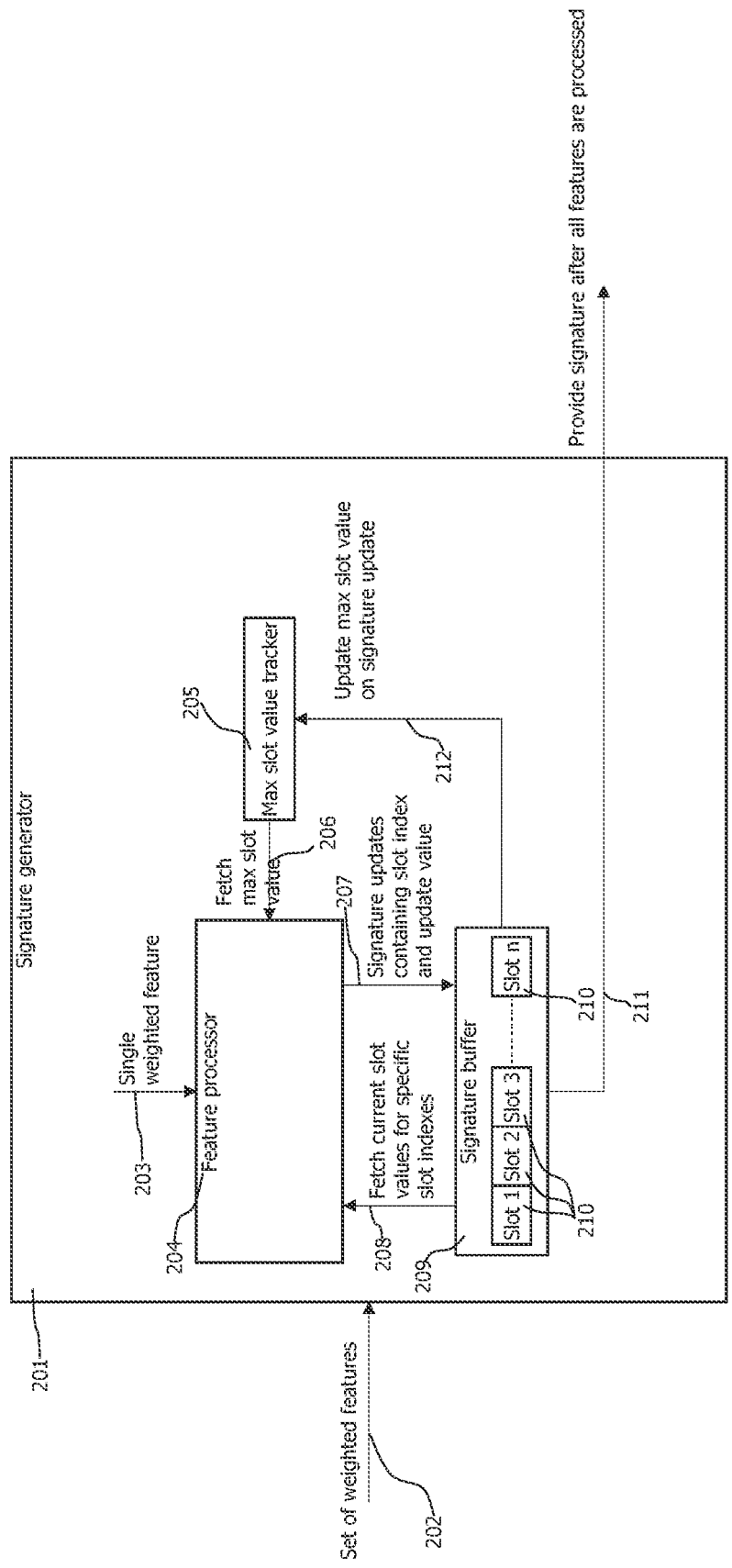
FIG 2: Signature Generator

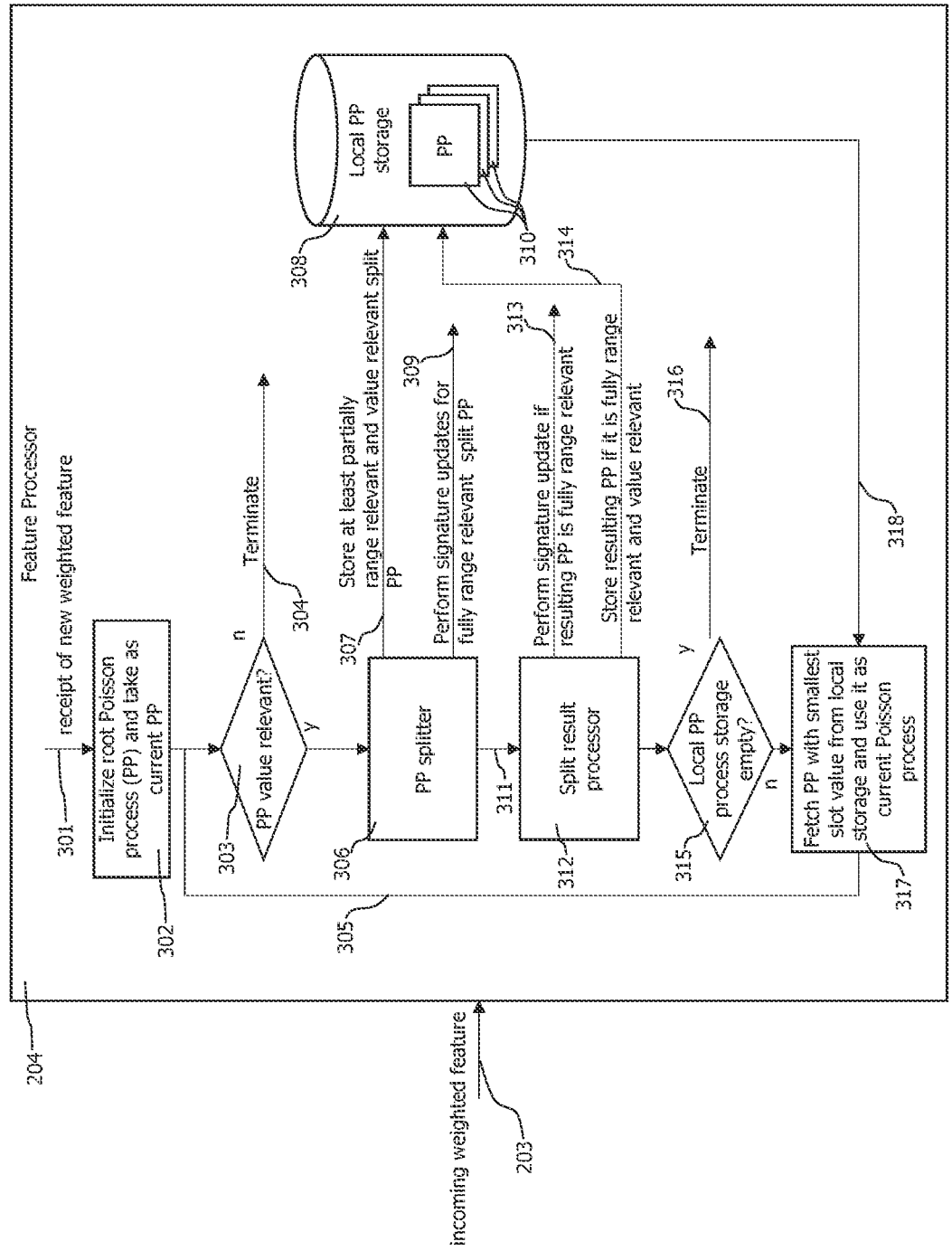

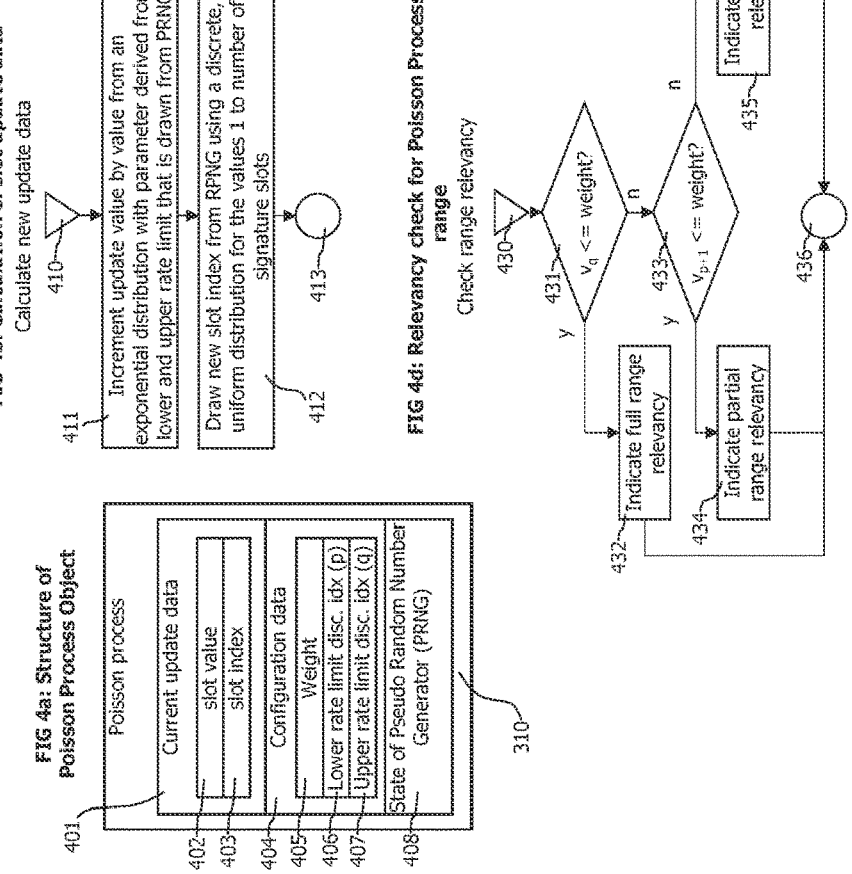

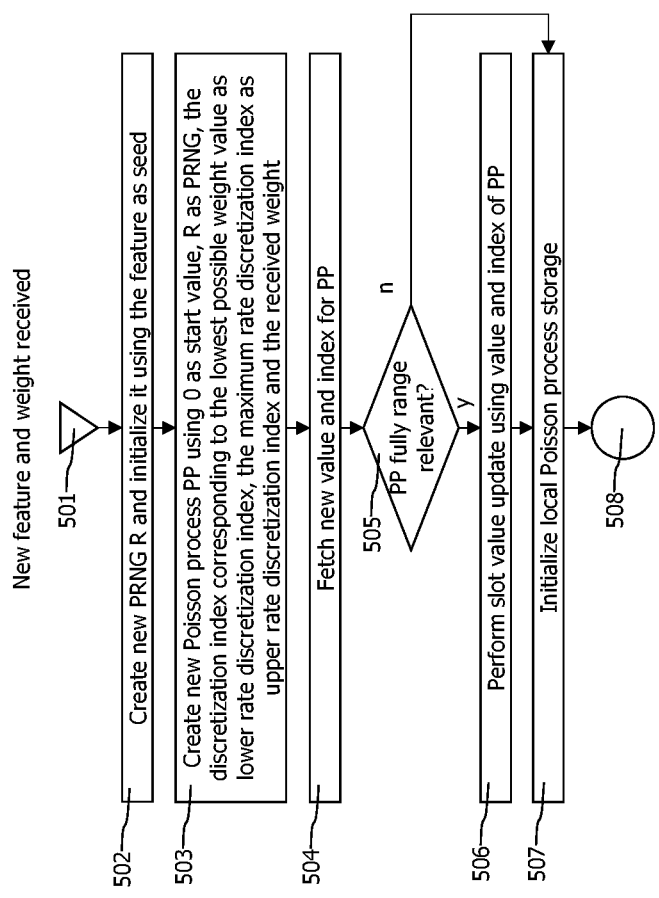
FIG 5: Initialization of Feature Processor on received Weighted Feature

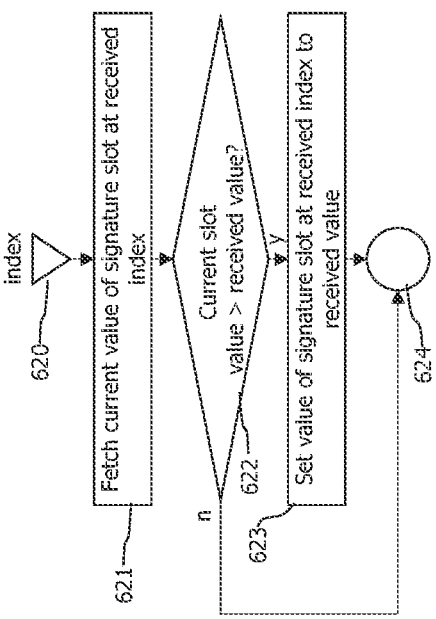
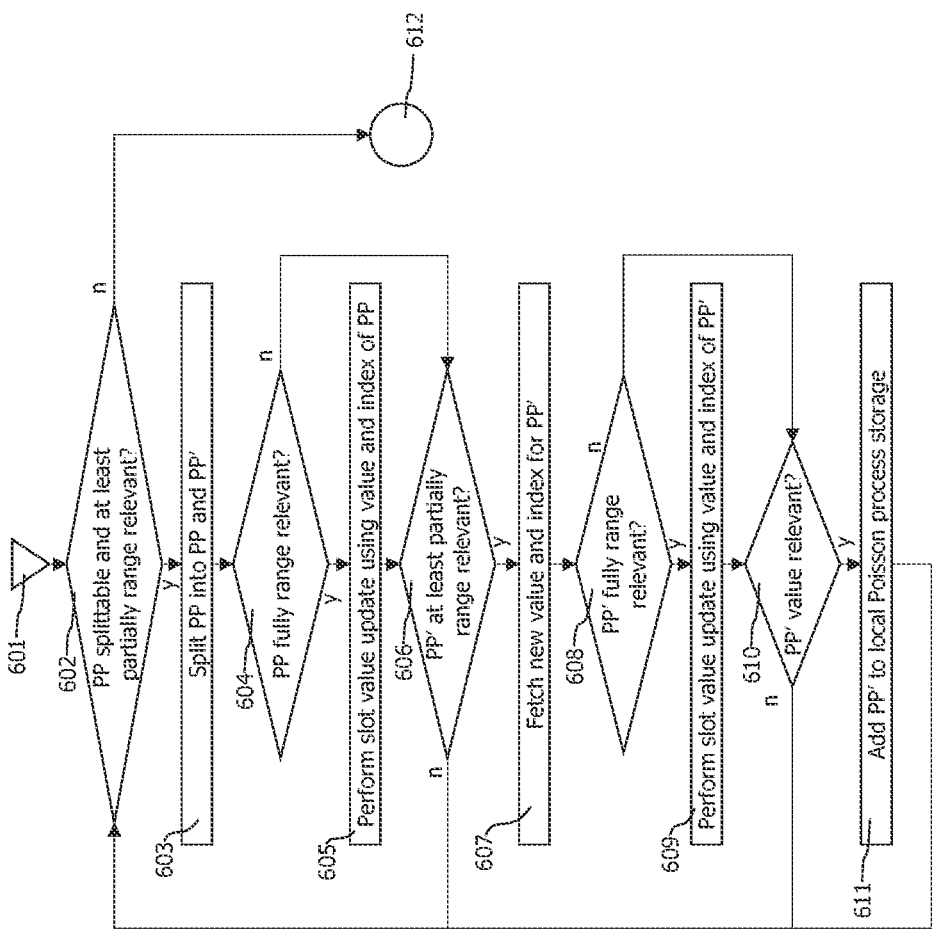

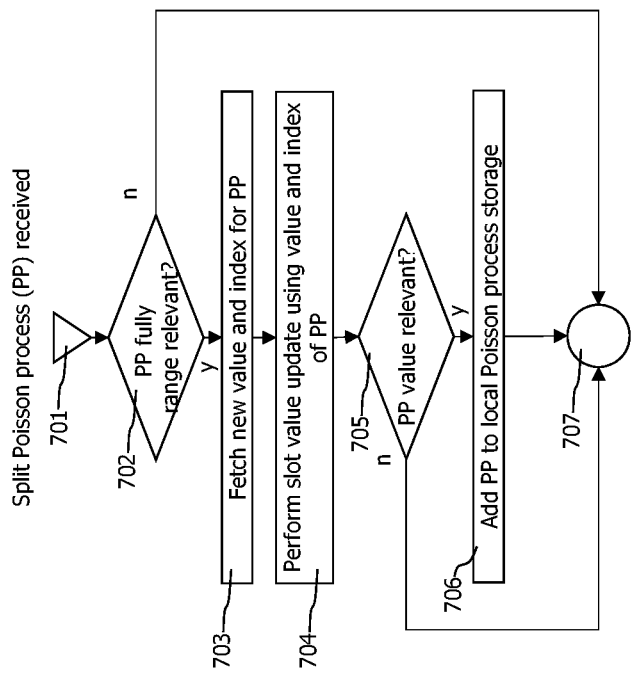
FIG 7: Split Result Processor Receives Split Poisson Process

FIG 8: BagMinHash Algorithm

```
Algorithm 6: BagMinHash 1.
  Input: w
  Output: h_1, h_2, ..., h_m
  (h_1, h_2, ..., h_m) ← (∞, ∞, ..., ∞)
  forall d ∈ D such that w(d) ≥ c_1 do
      R ← new PRNG with seed d
      P ← new PoissonProcess(t, R, 0, L, w(d))
      P.Next()
      if P.FullyRelevant() and P.x < h_{P,i} then h_{P,i} ← P.x
      create new min-heap for Poisson processes P with P.x as key
      while P.x ≤ h_max do
          while P.Splittable() and P.PartiallyRelevant() do
              P' ← P.Split()
              if P'.FullyRelevant() and P'.PartiallyRelevant() then
                  P'.Next()
                  if P'.FullyRelevant() and P'.x < h_{P,i} then h_{P,i} ← P'.x
                  if P'.x ≤ h_max then push P' to heap
          if P.FullyRelevant() then
              P.Next()
              if P.x < h_{P,i} then h_{P,i} ← P.x
              if P.x ≤ h_max then push P to heap
          if heap is empty then break
          P ← pop from heap
```

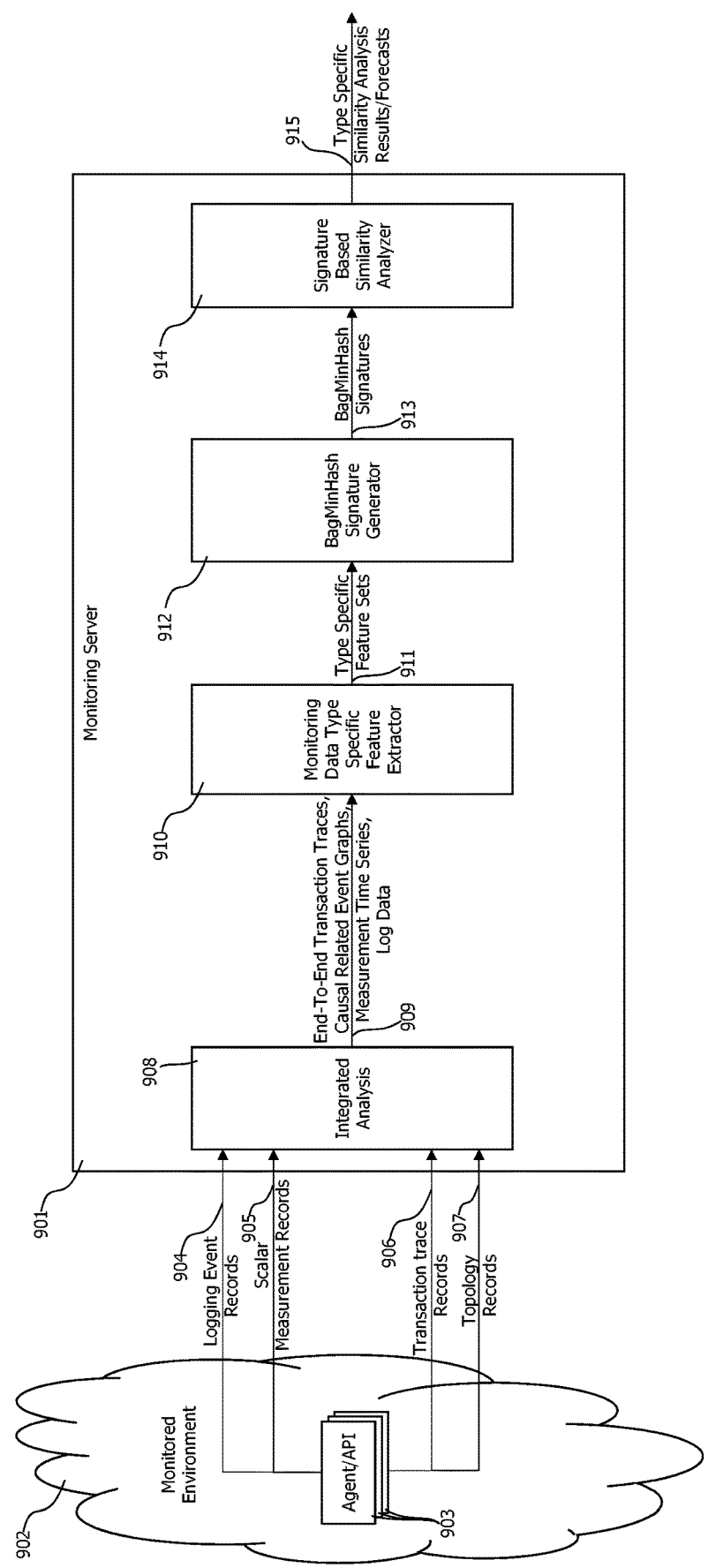
FIG 9: Exemplary Application in the APM Area

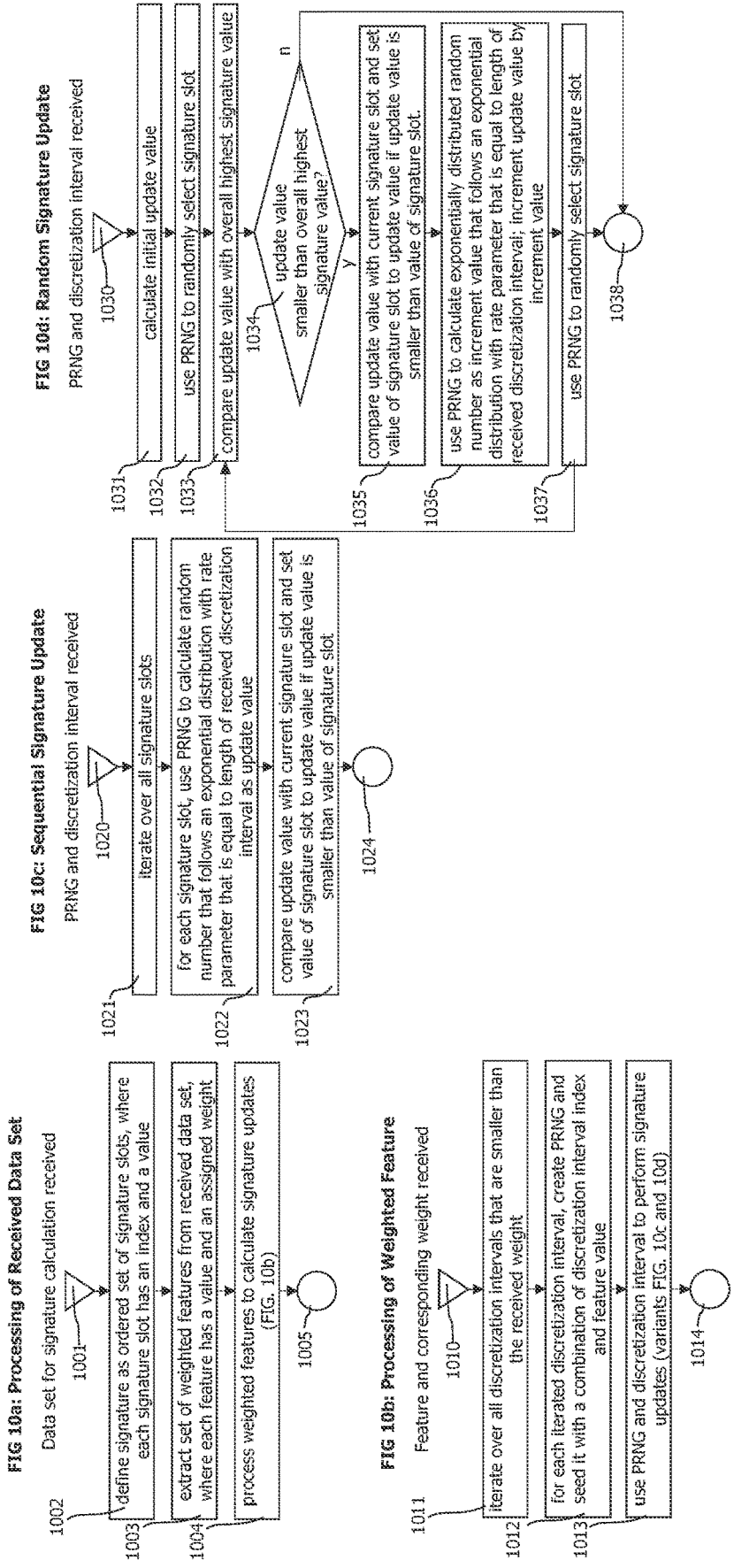

METHOD AND SYSTEM FOR CALCULATING MINWISE HASH SIGNATURES FROM WEIGHTED SETS

CROSS-REFERENCE TO RELATED APPLICATIONS

This application is a continuation of U.S. patent application Ser. No. 16/786,992, filed Feb. 10, 2020. This application claims the benefit of U.S. Provisional Application No. 62/803,750, filed Feb. 11, 2019. The entire disclosures of the above application are incorporated herein by reference.

FIELD OF THE INVENTION

This invention generally relates to the calculation of locality sensitive hash signatures based on a weighted feature set and more specifically to the calculation of hash signatures based on weighted features utilizing the discretization of real weight values in combination with pseudo random number generators based on a Poisson Process model for a computational efficient calculation of signature values.

BACKGROUND

Modern economy and society produce vast amounts of data and require fast, efficient and accurate processing and analysis of this data. Cornerstones of this analysis are similarity and distance metrics which measure the degree of similarity or difference between data objects or documents. Due to large amount of produced and processed data, an exact similarity determination is, in most cases, infeasible due to required computing resources and/or time.

Locality sensitive hashing algorithms, like MinHash address this problem by creating numeric signatures or fingerprints of data objects or documents. A key feature of those signatures is that similar data objects produce similar signatures. Consequently, the signatures can be used to implement a fast similarity estimation.

Although the usage of signatures for similarity estimation greatly improves performance, the creation of the signatures themselves represents a performance problem. Especially the case of data objects described by weighted feature sets remains a problem as the time complexity of state-of-the-art algorithms to create a signature for weighted feature sets depends on the product of the number of input features and the size of the created signature. Decreasing the number of features or the size of the created signature to improve the performance of the signature creation process would have an adverse effect on the estimation error of later similarity estimations performed with the created signatures.

Therefore, a signature calculation algorithm that can handle large feature set and signature sizes is desired. Consequently, a system and method are desired in the art that overcomes above limitations.

This section provides background information related to the present disclosure which is not necessarily prior art.

SUMMARY

This section provides a general summary of the disclosure, and is not a comprehensive disclosure of its full scope or all of its features.

The present disclosure is directed to a method for the efficient calculation of locality-sensitive hash signatures using weighted feature sets as input. The presented signature calculation method shows an improved time complexity compared to currently known approaches. The created hash signatures may be used as input for similarity estimations based on the Jaccard index.

The proposed signature calculation algorithm depends on the discretization mechanism used to represent the weight values of the input features.

Exemplary embodiments of the disclosed technology may use a function that generates exponentially distributed pseudo random numbers, where the rate parameter of the exponential distribution corresponds to a discretization step of the discretization mechanism used to represent the weight. A discretization step is defined as the value range between two adjacent discrete representable values. An incoming real number with a value between those two adjacent discrete values may be mapped either to the lower or higher discrete value.

For a processed input feature/weight pair, the discretization steps that are smaller than the current weight may be selected. A pseudo random number generator (PRNG) may be created and initialized for each selected discretization step and initialized with the input feature and the index of the discretization range. The PRNGs may be used to draw pseudo random numbers from an exponential distribution that is parameterized with a rate corresponding to the selected discretization step. Such a pseudo random number may be created for each signature value. In case the created exponentially distributed random number is smaller than the current signature value, the current signature value may be set to the created random number.

It should be noted that PRNGs typically create random numbers that follow a uniform distribution, and various statistical applications require random numbers that follow other types of distributions, like e.g. an exponential distribution. Various methods are known in the art that transform random numbers following a specific distribution into random numbers following another distribution. Inverse transform sampling, rejection sampling or the ziggurat algorithm are examples for such methods.

Other variant embodiments may employ a Poisson Process model that uses the PRNGs to generate exponentially distributed pseudo random numbers in ascending order. Those variants may in addition to each created exponentially distributed random number, create a uniformly distributed random number. The uniformly distributed random number may be used to randomly select a signature value for update. In case the current exponentially distributed random number is smaller than the selected signature value, the selected signature value is set to the exponentially distributed random number.

With this procedure, the signature values can only be decreased, and the exponentially distributed random numbers, that are used to update signature values, are generated in increasing order. Consequently, creation of random numbers for a given feature can be stopped when the highest signature value is smaller than the current exponentially distributed random number, as the current and all subsequently created exponentially distributed random number cannot change any signature value. Embodiments of the disclosed technology may track the highest signature value and compare it to the current exponentially distributed random number to determine when processing of the current feature can be terminated. This eliminates unnecessary random number creations which improves the performance of the signature creation process.

Yet other variant embodiments may in addition use the ability of Poisson processes to be merged and split to further improve the performance of the algorithm by eliminating additional unnecessary random number creations.

Basically, a Poisson Process describes the frequency of the occurrence of random events and is configured with a rate parameter that specifies the expected rate of the random events. A Poisson Process configured with a high rate produces, on average, a high number of random events for a specific time interval and a Poisson Process with a low rate produces less events. Splitting a Poisson process into sub processes that are equivalent to the original Poisson process may be performed by creating multiple Poisson processes, where a fraction of the original rate is applied to each created Poisson process. Consequently, each new Poisson process will create random events with a lower frequency than the original Poisson process, but the combined event frequency of all new Poisson processes will be equal to the event frequency of the original Poisson process.

The variant embodiments may first initialize a Poisson process with a rate representing the whole discretization range available for the representation of feature weights and then perform a hierarchical split and search process for the Poisson process with a rate that best matches the current feature weight. During this search, not relevant Poisson processes that correspond to discretization steps higher than the current feature weight are discarded. Relevant Poisson processes that correspond to discretization steps that are smaller than the current weight are kept for subsequent processing. This greatly reduces the number of required random number generations. The kept relevant Poisson processes are processed in a sorted fashion, starting with the process having the smallest current random number and continuing according to increasing current random numbers. This assures that smaller random numbers are created first during processing of the kept Poisson processes, which increases the probability that the termination condition defined by the highest signature value is reached early, which again decreases the number of required random number creations.

The application performance monitoring and management space (APM) is an area that provides a wide range of possible applications for the proposed signature calculation methodologies. Modern APM applications typically deploy agents to components of a monitored computing environment. Those agents then monitor the computing environment and provide data describing the structure of the monitored system, resources used by the components of the systems and performed activities or log data created by components of the monitored system. The monitoring data provided by the agents may, by a centralized monitoring data processor that receives the data from all deployed agents, be analyzed and integrated to create higher-level monitoring data artifacts. Those monitoring data artifacts may contain end-to-end transaction trace data of transactions performed by the monitored system, an integrated topological model of the monitored system, time series data describing resource utilization by the monitored system, log data sequences and graphs of causally related events indicating abnormal operating conditions that were observed in the monitored environment.

The higher-level performance monitoring artifacts may be processed by a feature extraction component, which creates for each received monitored artifact a set of descriptive, potentially weighted features.

The created feature sets may be forwarded to a signature generator that generates corresponding locality sensitive hash signatures using the here described BagMinHash technology.

A similarity analyzer may then use the signatures to e.g. identify similarities between different monitoring artifacts. An example application of such a similarity analysis would be to identify, for a currently observed abnormal condition on the monitored environment, similar abnormal conditions in the past, lookup the actions that resolved the already observed similar abnormal operating conditions and automatically propose those actions as potential solution for the current abnormal condition.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1. Provides a conceptual overview of processing steps performed to process a set of weighted features.

FIG. 2 Shows a block diagram of a signature generator observing the maximum value of all signature slots.

FIG. 3 Depicts a block diagram of a feature processor which sequentially processes weighted features to generate signature updates.

FIG. 4. Shows a structural overview of objects representing Poisson processes used for the BagMinHash calculation together with flowcharts describing processes performed by those Poisson process objects.

FIG. 5 Provides a flowchart of the process performed during initialization of the feature processor on receipt of a weighted feature.

FIG. 6 Contains flowcharts describing the splitting of a Poisson process and the signature value update processing potentially performed during a Poisson process split.

FIG. 7 Shows a flowchart describing the processing of the split result processor on receipt of a split Poisson process.

FIG. 8 Provides a notation of the BagMinHash algorithm in pseudo code.

FIG. 9 Shows a block diagram of a potential application of a BagMinHash signature generator in the APM space.

FIG. 10 Provides a flow a conceptual process that illustrates the basic concepts that are used to create signatures for weighted sets based on the discretization mechanism used for the weights.

Corresponding reference numerals indicate corresponding parts throughout the several views of the drawings.

DETAILED DESCRIPTION OF EXEMPLARY EMBODIMENTS

Example embodiments will now be described more fully with reference to the accompanying drawings.

The disclosed technology is related to the calculation of locality sensitive hash signatures or fingerprints, out of sets of weighted features describing input objects. The calculated signatures may then be used to estimated Jaccard coefficient of the input sets, which may be used as an estimation for the similarity of the input objects.

The processed input objects typically consist of large and complex sets of data, like text documents, images or high-dimensional data describing e.g. the state of a monitored system. Size and complexity of the data representing the input objects makes a direct comparison impossible in most cases. Therefore, the input objects are in a first step analyzed to create a feature set that describes the input objects using less data. In many cases, the features forming those feature sets are accompanied by a real number representing the weights of those features. An example for real number feature weights in text documents is the term frequency-inverse document frequency measure (TF-IDF), which combines the occurrence frequency of a term within an input document with a measure describing the inverted frequency of the term in a set of reference documents to determine a weight for the term.

Although the generated feature sets provide a compacted and smaller representation of the input objects, they still represent an amount of data that is too large to perform an efficient similarity analysis. Locality sensitive hashing methods, like MinHash may be used to further reduce the input data for similarity analysis. Those locality sensitive hashing methods typically create signatures in form of sequences of integer numbers which can be easily processed by computer systems. Further, locality sensitive hashing methods preserve similarity relations between corresponding sets of input data. In other words, two different weighted feature sets, having a large fraction of equal or similar features and weights, produce signatures that contain a corresponding fraction of signature elements that are equal or similar.

This additional data reduction that is achieved by locality sensitive hashing finally produces data that is both small enough for an effective similarity analysis and that is also still sufficiently significant to describe the original input objects.

The created signatures typically consist of lists of numbers, which represent a format that is ideal for the calculation of a Jaccard index. The Jaccard index, which is a measure for the similarity of sets, may be calculated by determining the number of signature elements that are identical for two signatures and dividing the number of identical elements by the total number of signature elements. As creating feature sets out of input elements and then creating corresponding signatures, to reduce the input data to a manageable size, also causes a loss of data, the resulting Jaccard indices only represent an estimation of the real similarity, but the quality of this estimation is sufficient for most application. Further, the estimation error can be influenced and reduced by increasing both the size of the input feature set and the size of the created signature.

However, the reduced estimation error comes at the price of increased costs for the calculation of the signatures. This remains a problem especially for the case of weighted feature sets, as the runtime complexity of the most efficient algorithm known in the art, the improved consistent weighted sampling (ICWS) algorithm, increases proportional to the product of the size of the weighted feature set used as input and the size of the created signature.

The ICWS algorithm is capable to calculate MinHash bases signatures for arbitrary positive real weights. This may be an interesting feature for the theoretical consideration of this approach, but the practical benefit of this feature is limited because computer systems represent real values by discrete values from a finite set. Typically, those discrete values are selected in a way that the relative discretization error that occurs when mapping an incoming real value to its corresponding discrete value remains the same for the whole value range covered by data type used to store the incoming real value. As a consequence, the distances between consecutive discrete values varies and increases with the discrete values. An example for such a discretization mechanism is the IEEE 754 standard for the binary representation of floating-point numbers.

Typically, floating point numbers are represented in computer systems by a mantissa or fraction, which specifies the significant digits of the floating-point number and an exponent which specifies a factor for the number represented in by the mantissa. Both mantissa and exponent are themselves represented as integer numbers, and also the data format that is used to store them is equal to the data format used to store integer numbers. The storage layout of floating-point numbers typically locates the fraction in the least significant bits of the memory representing the floating-point number (i.e. bits 0-22 for single precision floating-point numbers) and the exponent in the subsequent higher bits (i.e. bits 22-30). Incrementing a floating-point number by a discretization step is performed by incrementing the value of the mantissa by one. In case the value of the mantissa before the increment was already at the maximum value, this causes an overflow of the mantissa. In case of a mantissa overflow, the value of the mantissa is set to zero, and the value of the exponent is incremented by one. As mantissa and exponent are both represented as integer numbers, mantissa and exponent are located adjacent and mantissa is stored in the lower significant and exponent in higher significant bits, this mechanism is exactly the same as the increment of an integer number representing a combination of mantissa and exponent. As a consequence, to determine the discretization index of a given floating-point number, it is sufficient to interpret the memory are representing the floating-point number as an integer data type. The value of this integer data type represents the discretization index of the floating-point number. For a given integer data type that represents a discretization index for a floating-point number, it is sufficient to interpret the integer data type as floating-point data type. The value of floating-point data type represents the floating-point value of the discretization index.

The mantissa/exponent storage format also causes discretization steps that vary over the value range of a floating-point number. An increment of the mantissa by one represents one discretization step. This discretization step is then scaled by the exponent. As a consequence, a discretization step for a small exponent gets a smaller scale than a discretization step at for a greater exponent, which leads to discretization steps that vary over the value range of a floating-point number.

The fact that the accuracy provided by ICWS algorithm cannot be exploited due to the internal representation of real numbers by computer systems leads to the idea of an algorithm that trades this nice but not usable feature to gain more performance. In addition, this new approach may even take advantage of the discretization mechanism during the signature calculation.

In addition, the new approach may use pseudo random number generation techniques that can be configured to create pseudo random numbers depending on discretization ranges and that are capable to create random numbers in ascending order. Further, the used pseudo random number generation technique may allow to split a parent pseudo random number generating entity into multiple split or child pseudo random number generating entities in a way that the combined random number generated by the child generator are statistically identical to the random numbers generated by the parent pseudo random number generating entity. Poisson processes provide these features and may be used by the new approach to create pseudo random numbers.

MinHash signatures are created by selecting the minimum value out of a set of pseudo random values that are created for a feature/weight tuple. Therefore, a pseudo random number generation mechanism that generates random numbers in ascending order can be beneficial, e.g. to implement an early exit condition for the processing of feature/weight tuples. The early exit condition may e.g. monitor the overall minimum value of all signature values and compare it to the last generated random number. In case the last generated random number is already higher than the highest overall signature value, processing of the current feature/weight tuple can be terminated as subsequent random numbers generated for this feature/weight tuple can only be larger and can therefore also not change the signature.

Further discussion of this approach is described by Otmar Ertl in "BagMinHash—Minwise hashing algorithm for weighted sets" In Proceedings of the ACM SIGKDD 24th International Conference on Knowledge Discovery and Data Mining (KDD), pages 1368-1377, 2018 which is incorporated in its entirety herein.

Basically, a Minhash algorithm for weighted feature sets needs to create random number sequences where the probability that the created random number sequences for two equal features that are assigned different weight values is proportional to the ratio of those weight factors. This produces equal random number sequences when feature and weight are identical and creates deviating random number sequences if the weights are different, where the degree to which those sequences differ depends on the difference of the weight parameters. Note: those equal features belong to different feature sets.

The proposed approach may use the discretization mechanism that is used to represent weight values in computer systems to create the random number sequences with the desired properties. A random number may be created for each discretization step that is below the actual weight. As a result, for equal features that are also assigned an equal weight, identical random number sequences are created. If the weight values differ, also the number of created random numbers differ and this difference depends on the difference of the created differ.

More precisely, the processing of an individual feature/weight tuple may be performed as follows. A first loop may iterate over each weight discretization interval for which the lower bound of the weight discretization interval is lower than the value of the currently processed weight. In each iteration of the first loop, a pseudo random number generator may be created and seeded with the value of currently processed feature and the index of the currently processed discretization interval, and a statistical distribution may be selected depending on the length of the currently processed discretization interval (e.g. Exponential distribution parameterized with a rate parameter proportional to the upper bound minus the lower bound of the current discretization interval). A second nested loop may iterate over each signature slot. Each iteration of this loop may use the created random number generator and the selected statistical distribution to draw a random number that follows the statistical distribution. The value of the currently processed signature slot may be updated to the drawn random number if it is greater that the random number.

An improvement of the proposed algorithm may use the created random number sequences to determine a candidate signature value and a candidate signature index. The actual signature value on the selected signature index may only be updated with the candidate signature value if it the candidate signature value is smaller than the actual signature value. This algorithmically differs from the conventional approach to calculate Minhash signatures in which signature values are updated sequentially according to their index position, but the created results are statistically identical.

A further improvement may model the dependency of created random number sequences on the feature weights using a Poisson process model. Poisson processes are used to model the time of the occurrence of random events. As a consequence, they may be used to create random numbers in ascending order. This feature of Poisson processes may be used in combination with the interleaving update of signature slots to define an early exit condition for the calculation of random numbers for a feature to improve the performance of the algorithm.

To implement this improvement, the overall maximum signature value may be monitored and compared with the current created random number. If the current random number is already larger than the overall maximum, processing of the current feature can be stopped as no further random value created for this feature can in update any signature slot.

Poisson process may in addition be parameterized with a rate parameter which specifies the probability for the occurrence of an event in a given time period. Poisson processes with higher rates produce random numbers with higher density, i.e. the average delta between created random numbers is smaller. This feature of Poisson processes may be used to model weight discretization ranges of different sizes e.g. by representing a discretization range by a Poisson process with a rate parameter that is proportional to the width of the discretization range.

Further, Poisson Processes are splittable and mergeable. Splitting of a Poisson process may be performed by assigning fractions of the rate of the original Poisson process to two or more child Poisson processes. As long as the sum of the rate parameters of the child processes is equal to the original Poisson process, the random values created by the original process and the combined random values created by the child processes are statistically equivalent.

Merging of Poisson processes may be performed by creating one Poisson process with a rate parameter that is equal to the sum of the rate parameters of the Poisson processes that are to be merged.

The split/merge feature of Poisson processes may be used to further improve the algorithm by eliminating further unnecessary random number generations.

The improvement may start with a Poisson process representing the whole discretization range and then splitting this Poisson process into two child processes, where one child process corresponds to the lower half of the discretization steps and is initialized with a rate parameter that proportional to the discretization range covered by those discretization steps and the other child process corresponds to the upper half of the discretization steps and initialized with a corresponding rate parameter. This splitting may be used in an iterative, binary decision and elimination process that identifies and discards Poisson processes that are not relevant, e.g. because they correspond to discretization intervals that do not intersect with the current weight (i.e. describe value ranges that are larger than the current weight) and use only relevant Poisson processes to create random numbers. For identified relevant Poisson processes their current random value may be compared with the current overall maximum signature value and in case the current random value is still smaller than the overall maximum value, the Poisson process may be stored in a buffer for later processing. The buffer may store the Poisson processes in a way that supports fast access to the Poisson process with the smallest current random number, as those buffered Poisson processes may later be processes according to their current random number in ascending order to improve the probability to generate small random numbers first.

The signatures generated by MinHash algorithms, like the BagMinHash algorithm typically consist of a sequence of integer numbers. Those integer numbers may be referred to as signature slots, and the position of a specific signature slot in the signature may be referred to as slot index. Therefore, such an algorithm may generate multiple feature updates, each consisting of a feature value, describing a potential new value of a signature slot and a slot index identifying the signature slot to update.

MinHash signature algorithms use various forms of pseudo random generators to create sequences of pseudo random numbers that are used to calculate signature slot updates. In contrast to ideal random number generators, pseudo random number generators are deterministic in terms of the sequence of random numbers they create. Pseudo random number generators are typically initialized with a start parameter, called seed. Two pseudo random number generators of the same type that are initialized with the same seed parameter generate the same sequence of random numbers. The terms pseudo random number generators and random number generator and the terms pseudo random number and random number are afterwards used synonymous within this document.

Pseudo random number generators may be implemented using ideal hash functions. The seed value may be used as first input to the hash function and the result of the hash function may be used as first random number. In addition, a sequence counter that counts the number of already created random numbers may be maintained. For the creation of further random numbers, the seed value may be incremented by the number of previously created random numbers and the incremented seed value may then be used as input to the hash function. The corresponding outputs of the hash function may be used as subsequent random numbers.

A conceptual description for the usage of feature a weight discretization mechanism for the calculation of MinHash signatures from weighted sets is shown in FIG. 10.

FIG. 10a shows a flow chart of the overall signature calculation process. The process starts with step 1001 with the receipt of a data set, which may be a digital image, a text sequence, a DNA sequence, a log file or a similar large data set.

A signature is defined in following step 1002, as sequence of signature slots, where each signature slot has an index number and a signature value. The signature index number may be used to address individual signature slots. It is noteworthy that only signatures of the same length, with the same type of signature values and that were created using the same signature calculation process can be used for similarity estimation. If one of those parameters differ, completely different signatures are created, even if the input data sets are identical. Step 1002 may in addition initialize the signature by setting the value of each signature slot to the highest value that can be expressed by the data type of the signature value.

Following step 1003 extracts a feature set from the received data set. Extraction of the feature set may be considered as lossy data compression, where the desired result is a feature set that describes the original data set with sufficient accuracy. Each feature in the feature set may be accompanied by a continuous weight value.

Subsequent step 1004 processes each feature/weight pair to perform signature updates. Processing of feature/weight pair is described in detail in FIG. 10b. The process then ends with step 1005.

FIG. 10b describes the processing of individual feature/weight pairs and starts with step 1010, when a feature/weight pair is received for processing. Following step 1011 iterates over and selects each discretization interval of the data type holding the weight. As discussed earlier, values from a continuous value range are represented in computer systems using discretization mechanism that map continuous values to corresponding discrete values. Those discretization mechanisms typically use discretization intervals which correspond to a specific value range. Those discretization intervals may be considered sorted by the value range they represent. A continuous value is represented by a discretization interval.

Step 1011 may start with the discretization interval containing the value 0 and then iteratively select the next higher discretization interval until a discretization interval is reached that contains the weight or that is higher than the weight. The iterations may be counted and used as discretization interval index.

Following step 1012, which is executed for each discretization interval selected by step 1011, may then create a pseudo random number generator (PRNG) and seed it with a combination of the current feature value and the current discretization interval index.

Subsequent step 1013 is also executed for each selected discretization interval and uses the previously created PRNG to perform signature updates. The detailed processing performed by step 1013 is shown in two different variants in FIGS. 10c and 10d.

The process then ends with step 1014.

Coming now to FIG. 10c, which describes a process that performs sequential signature updates, where values of signature slots are updated according to their slot number.

The process starts with step 1020, when a PRNG and a discretization interval are received to perform signature updates. Following step 1021 iterates over all signature slots and executes following steps 1022 and 1023 for each signature slot.

Step 1022 calculates an update value for the currently processed signature slot by first drawing a random number form the PRNG and then converting it into a random number following an exponential distribution, where the rate parameter of the exponential distribution is proportional to the length of the received discretization interval. Some variant embodiments may draw multiple random values from the PRNG to create the random number following the exponential distribution.

Following step 1023 compares the current value of the currently processed signature slot with the update value calculated in step 1022. In case the update value is smaller than the current slot value, the current slot value may be set to the update value.

The process ends with step 1024 after steps 1022 and 1023 were executed for all signature slots.

FIG. 10d shows a process that performs the update of random signature slots. The process starts with step 1030, when a PRNG and a discretization interval are received to perform signature updates.

Following step 1031 uses the PRNG to calculate an initial update value. Step 1031 may create random number following an exponential distribution, as already described in step 1022 of FIG. 10c. Afterwards, the PRNG may be used to randomly select a signature slot for update.

Following step 1033 compares the highest value that is currently stored in any signature slot with the update value. Subsequent decision step terminates the process with step 1038 if the update value is not smaller than the current highest signature value. If otherwise the update value is smaller than the highest signature value (and it is still possible that the update value changes a signature slot), step 1035 is executed, which compares the update value with the value of the currently selected signature slot and sets the update value to the signature slot value if the signature slot value is greater than the update value.

Following step 1036 first creates an increment value, as already described in step 1022 of FIG. 10. The increment value is then added to the update value, to create random, ascending update values that follow an exponential distribution with a rate parameter that is proportional to the length of the currently selected discretization interval. Following step 1037 then uses the PRNG to randomly select the signature slot for the next update. Afterwards the process continues with step 1033.

Process 10d uses ascending update values for its signature updates and also monitors the current highest signature value to stop processing when subsequent iterations can no longer update any signature slot because the current update value is already greater than the highest signature value. The following is directed to various performance optimization of the above described concepts, which lead to a performance behavior that is superior to methods in the art, while still providing the same quality as the known methods.

Coming now to FIG. 1 that is providing a flow chart of the conceptual steps performed by the proposed algorithm to process a weighted feature. The process starts with step 101 when a weighted feature out of a received set of weighted features is received. Following step 102 first creates an update value for signature slot using a pseudo random number generation mechanism that was initialized with a seed derived from the incoming feature value. Some variant embodiments may us a combination of the incoming feature and its corresponding weight to calculate the seed value for the pseudo random number generator. Jet other variants may only use the feature value to calculate the seed for the pseudo random number generator and use the weight to influence the generation of random numbers by already seeded pseudo random number generators. As an example, some pseudo random number generators may create random numbers that follow an exponential distribution and those pseudo random number generators may permit to change the rate parameter for the used exponential distribution after the initialization of the pseudo random number generator with a seed is finished. Further, the pseudo random number generation mechanism may be configured with a parameter influencing the generated random numbers that corresponds to the whole discretization value range used to represent feature weights. The random number generation mechanism may e.g. create random numbers based on an exponential distribution and the rate of the exponential distribution may be selected as the parameter influencing the generated random numbers. As example, a Poisson process may be used that is configured with a rate parameter representing the whole discretization range. An exponentially distributed random number may be created by the Poisson process which follows an exponential distribution with the configured rate. The used Poisson processes may store the last created random number and generate the next random number by first drawing a new exponentially distributed random number and then adding this new random number to the last generated random number. During initialization of a Poisson process, its value for the last generated random number may be set to 0.

It should be noted, that an arbitrary type of discretization mechanism, e.g. discretization mechanism providing constant absolute error or providing constant relative error, or other weight value specific types of discretization mechanisms may be chosen, as the disclosed technology is capable to work with any type of discretization mechanism. It should further be noted that, in case an absolute maximum value of incoming feature weights is known, the considered discretization range may be adapted to only cover the known value range of the expected feature weights. This may e.g. be performed by configuring the above Poisson process with a discretization range that only covers the possible feature weights and not the whole discretization range of the data type used to represent the weights.

Further, step 102 may create a uniformly distributed random number in the range of the signature slots to determine a signature slot as update candidate. Afterwards, the current value of the randomly selected signature slot may be compared with the calculated update value. In case the calculated update value is smaller than the current value of the selected slot, the value of the selected slot is set to the update value. It should be noted that the values of all signature slots are initially set to the highest possible value, before the first weighted feature is processed.

Following step 103 starts to track the overall highest slot value of the signature. The continuous processing of feature weight tuples by the algorithm creates updates to random signature values, where each update can only decrease a signature value. A straightforward implementation of this process may e.g. after each signature update scan all signature values to identify the highest signature value after the update. A much more efficient way to track the highest signature value that uses a tree structure mapped to an array is described in Algorithm 5 in appendix A.

Following step 104 also represents the start of an ongoing process, which continuously compares the overall highest signature value with the new created update value (as e.g. performed in steps 102 and 109) and terminates the processing of the current weighted feature as soon as the update value is greater than the highest overall signature value, as this update value and any subsequent update values created for the current feature can not cause any change of the signature.

Step 105 then uses the split feature of Poisson processes to iteratively and randomly select a child Poisson process of the current Poisson process that has a range parameter that corresponds to an atomic discretization range. As described in step 102, a Poisson process is created that represents the whole discretization range. Step 105 may e.g. in a first iteration split this Poisson process into two Poisson processes, where the first Poisson process is configured with a rate corresponding to the value range of the lower half of the discretization steps and the second Poisson process is configured with a rate corresponding to the value range of the upper half of the discretization steps. It should be noted that, because the discretization mechanism might use ascending discretization steps to achieve a constant relative discretization error for the whole value range, the value ranges covered by both halves of the discretization steps differ. A Bernoulli or coin flipping trial may then performed to randomly determine the child process to which the current update value belongs. The trial may be performed using probability that the update value belongs to a specific child process that is proportional to the discretization range cover by the respective child process. Step 105 may then select the Poisson process to which the current update value belongs and may iteratively perform further splits until an atomic discretization range is reached. An atomic discretization range is a discretization range that cannot be further split into smaller discretization ranges. It should further be noted that the disclosed technology is not restricted to discretization mechanisms with varying discretization steps. The disclosed technology may also be applied for feature weights that are discretized using a discretization mechanism that uses identical discretization steps, and the disclosed technology may also be applied to integer weight values that are not discretized at all.

Step 106 is executed interleaved with step 105 and checks for each split Poisson process to which the current update value does not belong, if the lower bound of the discretization range covered by the process is smaller than the current weight and keeps those Poisson processes for subsequent processes. Poisson processes covering a discretization range that has a lower bound larger than the current weight are discarded by step 106.

The interleaved execution of step 105 and 106 ends when either an atomic discretization range is reached, or the Poisson Process to which the current update value belongs covers a discretization range with a lower bound larger than the current weight.

Following step 107 creates a new update value for each Poisson process that was kept by step 106 for further processing and stores the Poisson process in a data structure allowing fast access of the Poisson process with the smallest update value. A min-heap data structure organized by the update values may be used for this purpose. It should be noted that creating the update value may also create a new random signature slot index which may be used in a subsequent step. Step 107 may in addition identify those kept Poisson processes that cover a discretization range with an upper bound that is smaller than the current weight. Random signature index and update value of those Poisson processes may be used to perform signature slot updates if the corresponding current signature slot value is larger than the update value of the Poisson process.

Next, decision step 108 checks if the iteration performed by steps 105 and 106 detected that the current update value corresponds to a Poisson process with a range parameter describing an atomic discretization range with an upper bound that is smaller than the current weight. In case the current update value corresponds to such a Poisson process, step 109 is executed which uses the Poisson process identified by step 105 to create a new random update value and a random signature slot index. If the new update value is smaller than the current value of the signature slot identified by the random slot index, the value of the identified signature slot is updated to the new random update value.

Step 110 is executed after step 109 or if decision step 108 indicates that no matching Poisson process was found by step 105. Step 110 may fetch, out of the Poisson processes stored by step 106 or step 109 for subsequent processing, the Poisson process with the smallest current update value. The fetched Poisson process is also removed from the data structure.

In case step 110 could fetch a Poisson process, subsequent decision step 111 continues execution with decision step 112. If otherwise no Poisson process could be fetched, e.g. because all Poisson processes stored by step 106 or step 109 were already processed and the data structure storing the Poisson processes is empty, the process ends with step 114.

Decision step 112 compares the overall highest slot value with the update value of the Poisson process fetched in step 110 and terminates the process with step 114 in case the update value of the fetched Poisson process is greater than the overall highest slot value. Otherwise, step 113 is executed which prepares the next iterative step by using the Poisson process fetched by step 110 as current Poisson process. The process then continues with step 105 by processing the current Poisson process.

Coming now to FIG. 2 which provides a block diagram of a signature generator that receives a set of weighted features and produces a corresponding signature.

The signature generator 201 receives a set of weighted features and sequentially forwards the features 203 contained in the received set to a feature processor 204. The feature processor 204 processes received weighted features to create updates for signature slots 207, which are sent to a signature buffer 209 containing an arbitrary but fixed number of signature slots 210. During processing of weighted features 203, the feature processor also fetches 208 the current value of specific signature slots 210 and communicates with a maximum slot value tracker 205 to fetch the current overall highest slot value 206. The maximum slot value tracker 205 monitors updates performed on signature slots 210 in the signature buffer 209, detects 212 when such an update affects the overall highest signature slot value and, in this case, determines the new overall highest signature slot value. A subsequent request for the highest slot value 206 by the feature processor receives the new overall highest signature slot value.

After all weighted features 203 of the received feature set 202 are processed by the feature processor, the signal generator 201 provides 211 the signature stored in the signature buffer for subsequent processing.

Referring now to FIG. 3 which provides a block diagram of the internal components of a feature processor 204. A feature processor 204 receives individual weighted features for processing, which are used 301 in an initialization step 302 to initiate a root Poisson process, which is used as the current Poisson process. Creation of the root Poisson process includes the creation of a pseudo random number generator (PRNG) that is capable to create both exponentially distributed and uniformly distributed random numbers. The exponentially distributed random numbers may be used as an input for the generation of ascending random numbers by the Poisson process and the uniformly distributed random numbers may be used to randomly select a signature slot 210 for update. The PRNG may be initialized or seeded with the received feature. The root Poisson process may be initiated with a start value of 0, a rate parameter covering the whole feature-weight discretization range, the value of the weight of the feature and the previously created PRNG.

Poisson processes create random numbers in ascending order by adding the value of a new created exponentially distributed random number to the value of a previously created random number. The start value of a Poisson process represents the value that is used to create the first random number as substitute for a not yet available previous random number. The random numbers for the increments of the ascending random numbers follow an exponential distribution that is parameterized with a specific rate. The expected value of an exponential distribution is the inverse of its rate. As a consequence, the higher the rate of a Poisson process, the higher is the density of the random numbers created by the Poisson process. The density of the created ascending random numbers may also be considered as the number of random numbers for a specific value range. The higher the density of the random numbers is, the more random numbers fall into the specific value range. Those ascending random numbers created by Poisson processes are used herein for the update of signature slot values. Therefore, they may further also be referred to as slot value (see also element 402 of FIG. 4a).

The root Poisson process is initialized with the highest possible rate for the feature-weight discretization mechanism. This rate represents the whole discretization range for the feature weights. The root Poisson process may be considered as the Poisson process "containing" all other Poisson processes having smaller rates. As mentioned earlier, Poisson processes may be split into multiple child processes by splitting their rate. The union of the split Poisson processes is statistically equivalent to the original Poisson process. The initialization step 302 may then fetch a first set of random numbers (one ascending random number following an exponential distribution and one uniformly distributed random number) from the root Poisson process and set the root Poisson process as current Poisson process.

Afterwards, feature processor 204 checks 303 if the current Poisson process is value relevant. The value relevancy of a Poisson process is determined by comparing the slot value of the Poisson process with the overall highest signature value. The overall highest signature value may be fetched from a maximum slot value tracker 205. In case the slot value is higher than the overall highest signature value, the current Poisson process is not value relevant and the processing of the received weighted feature is terminated 304.

Otherwise, the current Poisson process is forwarded to a Poisson process splitter 306, which iteratively splits the received Poisson process by creating two child Poisson processes by assigning a rate corresponding to a discretization range covering the lower half of the discretization steps covered by the rate of the parent process to the first child process and a rate corresponding to a discretization range covering the upper half of the discretization steps to the second child process. Afterwards, the Poisson process splitter 306 determines to which of the child Processes the current value of the parent process belongs and continues by splitting the child process to which the current value belongs, until the current process can no longer be split, e.g. when an atomic discretization range is reached.

The split process is also terminated when the current Poisson process is no longer range relevant. A Poisson process is not range relevant when the lower bound of the discretization range assigned to the Poisson process is greater than the current feature weight.

During the split process, the Poisson process splitter in addition processes those Poisson processes which are, at least not immediately, further split because it was determined that the current random value does not belong to them. The Poisson process splitter first selects those Poisson processes out of the set of not further split Poisson processes that are at least partly range relevant. Partial range relevancy is given when the lower bound of the discretization range of the Poisson process is lower than the current weight. A new random number set, including an ascending, exponentially distributed and a uniformly distributed random variable are fetched from the selected Poisson processes. Further it is checked for the selected Poisson processes if they are fully range relevant. Full range relevancy is given when the upper bound of the discretization range of the Poisson process is lower than the current weight. In this case, a signature update is performed using the new random values fetched from the selected and fully range relevant Poisson processes. A signature update first fetches the current value of the signature slot 210 that is randomly selected by the uniformly distributed random variable and then compares the current value of the selected signature slot with the slot value of the Poisson process. When the current value of the selected signature slot is greater than the slot value, the selected signature slot is updated to the exponentially distributed random value. For the selected Poisson processes, it is in addition checked if they are value relevant. Value relevancy is given for a Poisson process when its slot value is smaller than the overall highest signature value. In case a selected Poisson process is value relevant, it is stored 307 in a local Poisson process storage 308 for subsequent processing. Poisson processes that are not value relevant are discarded.

The Poisson process splitter 306 also checks whether the Poisson process to which the current random value belongs is fully range relevant and, in this case, performs a signature update 309 using the current random values from this Poisson process.

The result of the Poisson split processor 306 is forwarded 311 to the split result processor 312. In case the Poisson process splitter detected that the initial random value (e.g. the exponentially distributed random value generated during the initialization process 302) belongs to a Poisson process that has a rate corresponding to an atomic discretization range and that is fully range relevant, the split result processor 312 fetches a new set of random numbers from the atomic and fully range relevant Poisson process identified by the Poisson process splitter and performs a signature update 313 using this new random numbers. Further, the split result processor checks if the identified Poisson process is value relevant, and in case value relevance is given, adds 314 the identified Poisson process to the local Poisson process storage 308.

The feature processor then proceeds to the next Poisson process 310 stored in the local Poisson process storage 308 by first checking whether the local Poisson process storage 308 still contains a Poisson process 310. The feature processing ends 316 if the local Poisson process storage is empty. Otherwise, the feature processor 204 fetches 317 the Poisson process 310 with the smallest slot value from the local Poisson process storage 308 and uses the fetched Poisson process as current Poisson process. The current slot value of the current Poisson process is used as current random number. Processing of the new current Poisson process starts with a check of its value relevancy 303 and continues as described above.

Coming now to FIG. 4 which describes details of the Poisson process objects used for the calculation of a Bag-MinHash signature. The structure of a Poisson process object 310 is described in FIG. 4a, FIG. 4b describes the calculation of new random variables by a Poisson process, FIG. 4c illustrates the split of a Poisson process and FIGS. 4d and 4e describe the determination of range and value relevancy for a Poisson process.

A Poisson process object 310 may contain but is not limited to a current update data section 401, a configuration data section 404 and the current state of the PRNG 408 used by the Poisson process object. The current update data section 401 may contain a exponentially distributed, ascending random value as signature slot value 402 and an uniformly distributed random value as signature slot index value 403. The configuration data section 404 may contain but is not limited to a weight field 405 containing the weight of the currently processed weighted feature, a lower rate limit discretization index 406 identifying the lower bound of the discretization range assigned to the Poisson process and an upper rate limit discretization index 407 identifying the upper bound of the discretization range assigned to the Poisson process. Upper and lower discretization index also represent the rate parameter of the created Poisson process. The rate of the Poisson process is given by the value corresponding to the upper discretization index 407 minus the value corresponding to the lower discretization index 406. The PRNG state field 408 may contain a PRNG object which internally holds data required to calculate the next pseudo random number. The slot value 402 may e.g. set to 0 during the initialization of a Poisson process as e.g. performed by the initialization component 302 of the feature processor.

The calculation of new signature slot update values, as described in FIG. 4*b* may be initiated by the receipt of a request to calculate new signature slot update values 410. Subsequent step 411 first fetches an exponentially distributed random value from the PRNG used by the Poisson process and then increments the slot value 402 by the fetched random value. The rate parameter of the exponential distribution used to fetch the random value may be set to the discretization range covered by the Poisson process as defined by its lower 406 and upper 407 limit discretization indices.

Afterwards, step 412 fetches a discrete, uniformly distributed random number from the PRNG, where the random number is selected from a range from 1 to the number of slots 210 of the signature 209. The fetched random number is set to the slot index 403 of the Poisson process 310. The process then ends with step 413.

The split of a given Poisson process object into two child process, where the current slot value 402 of the given Poisson process is assigned to one of the child processes is described in FIG. 4*c*.

The process starts with step 420 when a split of the receiving Poisson process is requested. Subsequent step 421 identifies the intermediate discretization index or split index of the discretization range assigned to the Poisson process. This may, for example, be performed by adding upper and lower limit index 406 and 407 and dividing the result by two. Various other methods may be used to determine a split index for the discretization range without leaving the scope and spirit of the present disclosure. This creates two new discretization ranges, one reaching from the value corresponding to the lower rate limit index 406 of the given Poisson process to the calculated split index and the other one ranging from the split index to the upper rate limit index 407 of the given Poisson process.

Following step 422 the creates a new PRNG which is initialized with a seed using the current slot value 402 and the split index calculated by step 421 as seed.

Typically, PRNGs require a single integer value as seed. To create a seed from a combination of multiple input values, like e.g. the current slot value and the split index, a hash function may be used that takes the combination of the input values as its input and creates a corresponding hash value which may the be used as seed for the PRNG. The combination of the input values for the hash function may be performed by first selecting a hash function that accepts a binary input value with a number of binary digits that is greater or equal to the sum of binary digits of all input values. The binary representations of all input values may then be concatenated and used as input for the hash function.

Subsequent steps 423 to 426 create a new Poisson process, representing one of the new discretization ranges and updates the given Poisson process to represent the other one of the new discretization ranges. The current exponentially distributed, ascending random value stored as slot value 402 is assigned to the given Poisson process and used as start value for the new created Poisson process. Prior to using the new Poisson process, new slot update data must be calculated for the new Poisson process as described by FIG. 4*b*.

Following step 423 uses a Bernoulli trial to determine which of the new discretization ranges is assigned to the new created Poisson process. Consequently, the given Poisson process is modified to represent the other new discretization range. A Bernoulli trial is a random experiment with exactly two possible outcomes, indicating success or failure. The flipping of a coin represents a simple example of a Bernoulli experiment.

A Bernoulli experiment may be parameterized with a success probability, which is, in this case, set according to ratio between the size of one child discretization range to the original discretization range. It is noted that the ratio between discretization indexes is close to ½, but as the size of discretization intervals may vary, this ratio usually is different to ½.

In case the Bernoulli experiment is parameterized with the ratio of the child discretization range covering the lower part of the original discretization range (e.g. value corresponding to calculated intermediate index minus the lower bound of the original discretization range) and the original discretization range, a success outcome indicates that the current slot value 402 corresponds to the lower child discretization range. A failure outcome indicates that the current random value belongs to the upper child discretization range.

Following decision step 424 analyzes the outcome of the Bernoulli trial and, in case of a failure, continues with step 425, which creates a new Poisson process using the new PRNG created in step 422, setting its slot value 402 to the slot value 402 of the original Poisson process, setting its lower rate limit index 406 to the lower rate limit index 406 of the original Poisson process, its upper rate limit index 407 to the split index calculated in step 421 and setting the weight 405 of the new Poisson process to the weight 405 of the original Poisson process. Step 425 further adapts the original Poisson process to represent only the upper half of the original discretization range by setting the lower rate discretization index 406 to the split index calculated in step 421.

In case the Bernoulli trial indicated a success, step 426 is executed, which also creates a new Poisson process using the PRNG created in step 422. In this case however, the lower limit index 406 is set to the split index calculated in step 421 and the upper limit index 407 is set to the upper limit index 407 of the original Poisson process. The upper limit index 407 of the original Poisson process is set to the split index calculated in step 421.

After step 425 or 426, a new Poisson process is created that covers a portion of the original discretization range that corresponds one half of the discretization steps contained in the original discretization range and the original Poisson process is adapted to cover a portion of the original discretization range corresponding to the other half of discretization steps.

Both original and new Poisson process now contain the same slot value 402, but the Bernoulli experiment performed by step 422 determined that this slot value belongs to the original Poisson process. Consequently, new update data needs to be calculated for the new Poisson process before it can be used, as e.g. described in FIG. 4*b*.

Following step 427 may provide the new Poisson process for later processing. The process then ends with step 427. As, according to the result of the Bernoulli trial performed in step 422, the current slot value 402 belongs to the original Poisson process, current slot value 402 and slot index 403 may be used as they are, without a calculation of new slot update data. It should be noted that the weight parameter 405 of a Poisson process 310 represents the weight of the current feature, which is set to the root Poisson process and then passed on to each split off child process. The weight parameter 405 is only used for the range relevancy determination described in FIG. 4d. Variant embodiments may use other means to access the value of the feature weight for this purpose.

Coming now to FIG. 4d which describes the process to check the discretization range relevancy of a Poisson process. The process starts with step 430 when a discretization range relevancy check for a specific Poisson process 310 is requested. Following decision step 431 compares the weight value 405 of the specific Poisson process 310 with the discretization value corresponding to the upper limit discretization index 407 of the specific Poisson process. In case the weight value is larger than or equal to the discretization value corresponding to the upper limit discretization index 407, the process continues with step 432 which indicates that the specific Poisson process is fully range relevant. Afterwards, the process ends with step 436.

In case the weight value 405 is smaller than the discretization value corresponding to the upper limit discretization index 407, the process continues with step 433 which compares the weight value 405 with the discretization value corresponding to the lower limit discretization index 406 incremented by 1. In case the weight value is larger than or equal to the discretization value corresponding to the lower limit discretization index 406 incremented by 1, the process continues with step 434 which indicates partial range relevancy of the specific Poisson process. Otherwise, the process continues with step 435 which indicates that the specific Poisson process is not range relevant. After step 434 or 435 the process then ends with step 436.

Referring now to FIG. 4e which describes the process of checking the value relevancy of a specific Poisson process. The process starts with step 440 when a request for a value relevancy check is received by a specific Poisson process 310. Following step 441 fetches the current overall highest signature slot 210 value, e.g. from the maximum slot value tracker 205. Afterwards, decision step 442 compares the slot value 402 with the fetched overall highest signature slot value. In case the slot value 402 is higher than the overall highest signature slot value, the process continues with step 444 which indicates that the specific Poisson process is not value relevant. Otherwise, step 443 is executed which indicates that the specific Poisson process 310 is value relevant. After step 443 or 444, the process ends with step 445.

Coming now to FIG. 5 which further describes the initialization process performed by a feature processor 204 on receipt of a new weighted feature. The process starts with step 501, when the feature processor 204 receives a weighted feature to process. Following step 502 creates new PRNG and initializes it with the value of the received feature as seed.

Following step 503 creates a new Poisson process 310, setting the start value of the Poisson process to 0 by setting its slot value 402 to 0, setting its lower discretization index 406 to a value corresponding to the lowest possible weight value, its upper discretization index 407 to a value corresponding to the highest possible weight value and setting the weight of the received weighted feature to the weight 405 of the created Poisson process.

Afterwards, step 504 fetches new update values from the created Poisson process, as e.g. described in FIG. 4b. Following decisions step 505 determines whether the created Poisson process is fully range relevant, e.g. by executing the process described in FIG. 4d and checking if the result of the process execution indicates full relevancy. In case the Poisson process is fully range relevant, the process continues with step 506 which performs a signature slot value update using the current slot value and slot index. Step 506 may first fetch the current value of the signature slot 210 identified by the slot index 403 and then compare the value of this signature slot with the slot value 402 of the created Poisson process. In case the slot value 402 is smaller than the current value of the signature slot 210 identified by the slot index 403, the value of the selected signature slot 210 will be updated to the slot value 402 of the created Poisson process.

After step 506, or when the created Poisson process is not fully range relevant, the process continues with step 507 which initializes the local Poisson process storage 308 of the feature processor 204. Step 507 may e.g. create a new min-heap data structure capable to store Poisson process objects which may later be used by the feature processor to store split Poisson processes for subsequent processing. Afterwards, the process ends with step 508.

Coming now to FIG. 6 which describes the process of Poisson process splitting as e.g. performed by the Poisson process splitter component 306 of the feature processor in FIG. 6a and the signature slot value update process performed by the feature processor e.g. during Poisson splitting or during the processing of the result of the Poisson split process.

The Poisson split process as described by FIG. 6a starts with step 601 when a Poisson process is received for splitting. Subsequent decision step 602 checks whether the received Poisson process can be split and if it is at least partly range relevant. The process described in FIG. 4d may be performed to detect whether the Poisson process is at least partly range relevant. It should be noted that full range relevancy implies partial range relevancy. Therefore, step 602 may check whether the Poisson process is either full or partial range relevant. Step 602 may further analyze lower 406 and upper 407 discretization index of the Poisson process to determine whether it can be split. In case lower 406 and upper 407 discretization index are adjacent, i.e. there is no other discretization index between lower 406 and upper 407 discretization index, the Poisson process can't be split. If the Poisson process is either not range relevant or can't be split, the process ends with step 612.

Otherwise, step 603 is executed, which performs a split of the Poisson process as described in FIG. 4c. As described earlier, the process to split a Poisson process first divides the discretization range of the Poisson process into two distinct discretization ranges. Afterwards it determines, using a Bernoulli trial, which of the of the two distinct discretization ranges corresponds to the slot value 402 of the Poisson process that should be split. The process then adapts the discretization range of the Poisson process to represent the discretization range selected by the Bernoulli trial. A new Poisson process is then created with a new PRNG and with the same slot value 402 as the incoming Poisson process and with the portion of the discretization range rejected by the Bernoulli trial.

Following step 604 determines if the Poisson process that was adapted in step 603 is fully range relevant, as e.g. described in FIG. 4d. In case the Poisson process is fully range relevant, step 605 is executed, which performs a slot value update using slot value 402 and slot index 403 of the Poisson process. FIG. 6b describes the signature slot update process in detail.

Decision step 606 is executed after step 605 or when decision step 604 determined that the Poisson process to be split is not fully range relevant. Step 606 determines for the new Poisson process created in step 603 whether it is at least partially range relevant. In case it is not partially range relevant, the process continues with step 602 to continue in splitting the received Poisson process. Otherwise, step 607 is executed, which fetches new slot update values from the new Poisson process, as e.g. described in FIG. 4b.

Subsequent decision step 608 checks if the new Poisson process is fully range relevant, as e.g. described in FIG. 4d. In case the new Poisson process is fully range relevant, step 609 is executed which performs a signature slot value update as described in FIG. 6b.

Following decision step 610, which is executed after step 609 or if decision step 608 determined that the new Poisson process is not fully range relevant, checks whether the new Poisson process is value relevant, as e.g. described in FIG. 4e. In case the new Poisson process is value relevant, step 611 is executed which adds the new Poisson process to the local Poisson process storage 308 for later processing.

The process then proceeds with step 602 to continue the split process for the received Poisson process.

Referring now to FIG. 6b which provides a flow chart of the process performed to update the value of a signature slot 210. The process starts with step 620 when a new slot update value and a slot index are received. Following step 621 fetches the current value of the signature slot 210 at the received slot index. Subsequent decision step 622 determines whether the current signature slot value is greater than the received slot update value. In case the current slot value is greater than the received update value, step 623 is executed which sets the value of the signature slot at the received index to the received slot update value. The process then ends with step 624.

Coming now to FIG. 7 which describes the processing of the result of the Poisson process split process described in FIG. 6a. This process may e.g. be performed by the split result processor 312 of the feature processor 204.

The process starts with step 701 when a Poisson process on which the split operation as described in FIG. 6a was performed is received. The Poisson split process (FIG. 6a) either terminates when the received Poisson process can no longer be split or when it is no longer range relevant. Therefore, following decision step 702 checks whether the received Poisson process is fully range relevant. As the split process either terminates when the split Poisson process can no longer be split, or it is no longer range relevant, full range relevancy of the received Poisson process also indicates that it corresponds to an atomic discretization range and i.e. can no longer be split.

In case the received Poisson process is not fully range relevant, the process ends with step 707. Otherwise, step 703 is executed which fetches new signature update values from the received Poisson process, followed by step 704 which performs a signature slot update using the new update values, as e.g. described in FIG. 6b. Subsequent decision step 705 checks if the received Poisson process is still value relevant. The value relevancy check may be performed as described in FIG. 6e. In case value relevancy of the Poisson process is still given, it is added to the local Poisson process storage 308 of the feature processor 204 in step 706. Afterwards, the process ends with step 707.

Coming now to FIG. 8, which provides a notation of the BagMinHash process in pseudo code.

Input to the process is a set of features D and a weight function w, which provides the corresponding weight for a given feature d contained in D. The output of the process is a set of signature elements $h_1$ to $h_m$. In a first step 801, the signature elements $h_1$ to $h_m$ are initialized by setting them to the highest possible value. The following loop 802 iterates over all feature elements d that have a corresponding weight that is greater than 0.

The first portion of the loop 803 performs initialization steps, like creating a PRNG and a Poisson process for the currently processed feature and weight, fetching signature update values from the Poisson process and initializing a min-heap data structure that may be used as local Poisson process storage 308. Following nested loop 804 iterates while the slot value 402 of the currently processed Poisson process is smaller or equal to the overall maximum signature value.

A first portion of this nested loop is again a loop 805 which iteratively splits off Poisson processes from the currently processed Poisson process until the currently processed Poisson process is either no more splitable or it is no more range relevant. This loop first performs the split operation (as described in FIG. 4c) and stores the split off Poisson process for further processing during the loop execution. Each iteration of loop 805 starts with a check whether the currently processed Poisson process is fully relevant, and in this case performs a signature slot update with the values of the currently processed Poisson process, as described in FIG. 6b.

Afterwards, the split off Poisson process is checked for partial range relevancy. In case it is at least partially range relevant, sequence 806 is executed. New signature slot update data is requested from the split off Poisson process, followed by a check whether it is fully range relevant. In case the split off Poisson process is fully range relevant, a signature slot update is performed. Finally, the split off Poisson process is checked for value relevancy and in case value relevancy is given, the split off Poisson process is added to the min-heap Poisson process storage (i.e. local Poisson process storage 308).

After the iterative Poisson process split procedure 805 is finished, the currently processed Poisson process is either not range relevant or no longer splitable.

Basically, loop 805 implements binary search for an atomic discretization step with an upper bound that is larger than the currently processed weight. This binary search iteratively divides sets of not atomic discretization ranges into upper and lower half, where each of the two halves contains the same number of atomic discretization ranges. A binary, random decision process (Bernoulli experiment) that depends on the relation of the value ranges covered by upper and lower half, that is based on deterministic random numbers is used to select either upper or lower halve of the discretization range in which the search is continued.

For the half that is not selected in this process, a check is performed whether it is relevant for subsequent processing of the current feature, and in case it is relevant, its corresponding Poisson process is stored in a buffer for later processing, where the buffer is sorted ascending by the current slot update values of the stored Poisson processes to access and process Poisson processes that still have small slot update values first. Processing those Poisson processes first increases the probability to create small slot updates faster which in turn increases the probability that the signature calculation process terminates faster.

The next portion 807 of the loop 804, which processes Poisson processes corresponding to the current weighted feature until the slot value 402 of the currently processed Poisson process is greater than the overall highest signature slot value, analyzes the state of the current Poisson process after the splitting procedure. In case the current Poisson process is fully range relevant, sequence 807 is performed which first fetches new signature update values from the Poisson process, then performs a signature slot update using those new update values and finally performs a value relevancy check of the Poisson process and, in case it is value relevant, adds it to the min-hash data structure that serves as local Poisson process storage 308.

Loop 804 continues with sequence 808 by checking whether the local Poisson process storage 308 is empty and, in case it is empty, terminates, which causes the loop 802 to advance to the next weighted feature. In case the min-heap is not empty, the Poisson process with the smallest slot value 402 is fetched from the local Poisson process storage 308 and loop 804 continues by checking whether the slot value 402 of the fetched Poisson process is smaller than the overall signature slot value. In case the slot value 402 is not smaller than the highest overall signature slot value, loop 804 is terminated and the enclosing loop 802 proceeds to the next weighted feature. Loop 802 terminates when all weighted features are processed.

Coming now to FIG. 9, which illustrates a possible application of the BagMinHash mechanism in the application performance monitoring (APM) space. Modern APM system produces a large amount of data of various levels of complexity. The produced data ranges from simple measurement time-series data, describing e.g. resource utilization of monitored components over time, over end-to-end transaction trace data describing performance and behavioral aspects of individual distributed transaction executions, user visit data containing sequences of transaction traces that describe distinct interactions of a user with a monitored system, real-time updated topological models of a monitored environment, to graphs of causally related events that were observed in a monitored environment. Use cases exist for all those different types of monitoring data that could benefit from an automatic similarity analysis. Those use cases range from comparing time series data from different time periods or from different origin, identifying clusters of similar end-to-end transaction traces or identifying past causally related event graphs that are similar to a currently observed situation to quickly find counter measures that helped in the past to solve a problem that is similar to a currently emerging problem.

APM systems typically consist of a set of agents or monitoring APIs 903 that are deployed to a monitored environment 902 to gather various types of monitoring data, as e.g. enumerated before. This monitoring data may be transferred from the agents to an analysis component like one or multiple, clustered monitoring servers 901. The monitoring data may be transferred to the monitoring server in form of monitoring data type specific events, like logging event records 904, scalar measurement records 905, transaction trace records 906 or topology records 907. Those monitoring events may be received by an integrated analysis component 908 operated by the monitoring server, which may first create monitoring data type specific analysis artifacts, like measurement time-series, end-to-end transaction traces or a topological model of the monitored environment. In a second step, the integrated analysis module may perform a combined analysis of the previously created artifacts to e.g. enrich the topology model with service call dependencies extracted from end-to-end transaction trace data, to identify performance or behavior critical change events using measurement and end-to-end transaction trace data and to localize those change events in the topological model. The integrated analysis module may perform a further analysis using the data describing the identified change events in view of the topology model to identify causal relations between identified change events to build graphs of causal related change events. Those graphs may be used to identify related events and to fast identify the root causes for effects that e.g. have an adverse impact of the users of the monitored system.

The monitoring data artifacts 909 created by the integrated analysis module may be forwarded to a feature extractor module 910, which provides a specific feature set extraction method for monitoring data artifact type. Those feature set extraction methods may be applied to received monitoring data artifacts to create feature sets describing the received monitoring data artifacts. The created feature sets may contain both weighted and non-weighted feature sets. A feature set may, next to the feature data that describes the monitoring artifact in a compact way, contain data that identifies the monitoring data artifact that was used to create the feature set. Various feature extraction techniques exist for text-based monitoring artifacts like log files or stack-traces. One of the most prominent feature extraction mechanism for text documents is the term frequency-inverse document frequency (TF-IDF) method that analyzes the frequency of a term in a document related to the overall frequency of the term in a whole universe of documents.

For graph-based monitoring artifacts like problem graphs, transaction traces or user visit data, an approach may be chosen that first identifies individual edges of the graph. For each one of the identified edges, the nodes that are connect the edge may be selected and a hash value may be created using the data describing both nodes. This hash value may then be used as feature value. The edge may in addition be assigned with a weight. As an example, for a problem graph, the weight may describe the probability of a causal dependency between the two nodes connected by the edge. This edge weight may also used as feature weight.

The created feature sets 911 may be forwarded to a BagMinHash signature generator 912 that operates as described above, which processes the received feature sets to create corresponding MinHash signatures. Again, the MinHash signatures may, in addition to signature slots 210, contain additional data identifying their corresponding monitoring data artifact.

The created MinHash signatures may be forwarded to a signature-based similarity analyzer to perform various similarity analysis related tasks, like to find for a given monitoring artifact the most similar monitoring artifact, also known as nearest neighbor detection. Further, the similarity analyzer may identify clusters of similar monitoring artifacts. The analysis results 915 of the similarity analyzer may be provided for further analysis steps or may be notified to a user of the monitoring system. The analysis tasks performed by the similarity analyzer 914 may either be performed on an ongoing, iterative basis and updated with each incoming signature, or they may be triggered by an external request.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer implemented method of improving similarity distance approximation between data sets, comprising:
    receiving a data set;
    defining a signature for the data set, where the signature is an array of values concatenated together and each element in the signature array has an array index value;
    extracting a group of data features from the data set, where each data feature has an associated nonnegative weight and the weight is discretized in a particular interval in a set of intervals using a discretization method, such that the particular interval is between a lower bound and an upper bound and length of intervals in the set of intervals varies;
    for a given data feature in the group of data features, determining a signature value for the signature array by
        selecting an interval from the set of intervals based on value of the given data feature and using the discretization method;
        defining an exponential distribution with a rate parameter derived from the selected interval,
        randomly and deterministically selecting an update value for a given element of the signature array from the exponential distribution, where the selection of the update value is in response to a lower bound and an upper bound of the selected interval being greater than zero and less than weight associated with the given data feature;
        retrieving a value from the given element of the signature array;
        comparing the update value to the value retrieved from the given element; and
        updating the value retrieved from the given element with the update value in response to the update value being less than the value retrieved from the given element.

2. The method of claim 1 further comprises determining, for the given data feature, a signature value for the signature array for a subset of intervals in the set of intervals, where intervals in the subset of intervals have a lower bound that is less than weight associated with the given data feature.

3. The method of claim 1 wherein selecting an interval from the set of intervals further includes determining whether a lower bound for the selected interval is less than weight associated with the given data feature; determining whether an upper bound for the selected interval is greater than weight associated with the given data feature; and splitting the selected interval into two intervals in response to the lower bound for the selected interval being less than weight associated with the given data feature and the upper bound for the selected interval being greater than weight associated with the given data feature, where range of the two intervals corresponds with the range of the selected interval.

4. The method of claim 3 further comprises randomly assigning the update value for a given element of the signature array to one of the two intervals using a biased Bernoulli trial.

5. The method of 1 where the update value is calculated as sum of a previous update value and a random number, and the random number is selected from the exponential distribution.

6. The method of claim 5 where the update value is calculated according to a Poisson process, and a rate of the Poisson process is derived from a discretization range covered by the selected interval.

7. The method of claim 6 wherein determining a signature value for the signature array for the given data feature further includes tracking a maximum value stored in the array of values of the signature, comparing the update value to the maximum value, and calculate another signature value for the signature array for the given data feature in response to the update value being less than the maximum value.

8. The method of claim 7 further comprises determining a signature value for the signature array for another data feature in the group of data features in response to the update value being greater than the maximum value.

9. The method of claim 6 where the Poisson process is stored in a min heap data structure and the min heap data structure is organized according most recent update value derived from the Poisson process.

10. The method of claim 9 where the Poisson process is excluded from storage in min heap data structure when the most recent update value derived from the Poisson process exceeds the maximum value stored in the array of values of the signature.

11. The method of claim 1 where the discretization method uses a geometric sequence to determine intervals in the set of intervals.

12. The method of claim 1 where the discretization method follows the IEEE Standard for Floating-Point Arithmetic (IEEE 754).

13. The method of claim 12 where an encoded value of the discretized weight is interpreted as an integer value to determine a corresponding discretization index, and the encoded value of the discretized weight is interpreted as a floating point value to determine a discretization range covered by a discretization interval identified by the discretization index.

14. A non-transitory computer-readable medium having computer-executable instructions that, upon execution of the instructions by a processor of a computer, cause the computer to perform:
receiving a data set;
defining a signature for the data set, where the signature is an array of values concatenated together and each element in the signature array has an array index value;
extracting a group of data features from the data set, where each data feature has an associated nonnegative weight and the weight is discretized in a particular interval in a set of intervals using a discretization method, such that the particular interval is between a lower bound and an upper bound and length of intervals in the set of intervals varies;
for a given data feature in the group of data features, determining a signature value for the signature array by
selecting an interval from the set of intervals based on value of the given data feature and using the discretization method;
defining an exponential distribution with a rate parameter derived from the selected interval,
randomly and deterministically selecting an update value for a given element of the signature array from the exponential distribution, where the selection of the update value is in response to a lower bound and an upper bound of the selected interval being greater than zero and less than weight associated with the given data feature;
retrieving a value from the given element of the signature array;
comparing the update value to the value retrieved from the given element; and
updating the value retrieved from the given element with the update value in response to the update value being less than the value retrieved from the given element.

15. The non-transitory computer-readable medium of claim 14 wherein the computer-executable instructions further perform to determine, for the given data feature, a signature value for the signature array for a subset of intervals in the set of intervals, where intervals in the subset of intervals have a lower bound that is less than weight associated with the given data feature.

16. The non-transitory computer-readable medium of claim 14 wherein selecting an interval from the set of intervals further includes determining whether a lower bound for the selected interval is less than weight associated with the given data feature; determining whether an upper bound for the selected interval is greater than weight associated with the given data feature; and splitting the selected interval into two intervals in response to the lower bound for the selected interval being less than weight associated with the given data feature and the upper bound for the selected interval being greater than weight associated with the given data feature, where range of the two intervals corresponds with the range of the selected interval.

17. The non-transitory computer-readable medium of claim 16 wherein the computer-executable instructions further perform to randomly assign the update value for a given element of the signature array to one of the two intervals using a biased Bernoulli trial.

18. The non-transitory computer-readable medium of claim 14 where the update value is calculated as sum of a previous update value and a random number, and the random number is selected from the exponential distribution.

19. The non-transitory computer-readable medium of claim 18 where the update value is calculated according to a Poisson process, and a rate of the Poisson process is derived from a discretization range covered by the selected interval.

20. The non-transitory computer-readable medium of claim 19 wherein determining a signature value for the signature array for the given data feature further includes tracking a maximum value stored in the array of values of the signature, comparing the update value to the maximum value, and calculate another signature value for the signature array for the given data feature in response to the update value being less than the maximum value.

21. The non-transitory computer-readable medium of claim 20 wherein the computer-executable instructions further perform to determine a signature value for the signature array for another data feature in the group of data features in response to the update value being greater than the maximum value.

* * * * *